3,193,497
PROCESS FOR MAKING A HYDROCARBON EXTENDING OIL FOR RUBBER
Herman R. Bentley, Hammond, Ind., assignor to Sinclair Research, Inc., Wilmington, Del., a corporation of Delaware
No Drawing. Filed Jan. 30, 1962, Ser. No. 169,960
2 Claims. (Cl. 208—271)

This invention relates to the production of an oil useful in the processing of rubber. More particularly, this invention relates to the production of a non-staining extending oil useful in the processing of rubber.

Petroleum extending oils are employed in the manufacture of rubber primarily to reduce its cost. The extending oil, however, also enhances certain properties in the final rubber product. For example, oil extended rubbers result in less heat build-up in automotive tires in service than do non-oil extended rubbers.

The petroleum extending oils so employed in rubber manufacture must have certain characteristics. First, the oils must be fully compatible with the rubber so that no oil will migrate to the surface of articles produced from such a rubber. Secondly, the oils must have low volatility so that oil is not lost from the rubber during its processing. A third requirement for a special type of oil extended rubber is that the oil must not cause discoloration of light colored articles produced from the rubber nor cause migration staining of painted surfaces in contact with the rubber. This special type of rubber is termed "non-staining, oil extended" rubber. To obtain better compatibility it is generally desirable to have a stock in the lubricating oil range, i.e., an oil with a viscosity of more than 50 SSU at 100° F. The maximum viscosity of the oil is limited by ease of dispensing it into the rubber composition, i.e., it must be sufficiently fluid to allow its addition to the mixing equipment. Aromatic oils are preferred for compatibility but in general such oils cause considerable discoloration and staining. Paraffinic oils have good stain qualities but poor compatibility. Thus, it has been found that naphthenic oils represent the best compromise between compatibility and staining characteristics. Petroleum oils having a high content of naphthenes, however, may still not be suitable for extending non-staining rubber due to the presence of trace amounts of compounds causing stain and discoloration.

In accordance with this invention, a process has been devised whereby oils of substantial naphthenic constituency containing the compounds causing stain and discoloration can be treated to provide non-staining extending oils useful in the processing of rubber. Thus, according to this invention, a petroleum hydrocarbon oil useful in the processing of rubber is prepared by a process including the steps of subjecting a lubricating oil raffinate having a pour point below about 25° F., obtained by the solvent extraction of a lubricating oil stock derived from a crude oil of substantial naphthenic constituency with a solvent selective for aromatics, to a treatment with acetone in an amount of about 50 to 700 volume percent of the lubricating oil feedstock at a temperature within the range of about 40° to 150° F. and a pressure within the range of about 0 to 50 p.s.i.g. A raffinate and an extract are separated and the separated raffinate is treated with concentrated sulfuric acid in an amount of about 5 to 30 pounds per barrel of oil.

Suitable rubber polymers in the processing of which the extending oils of my invention are employed include natural ruber, synthetic natural rubber prepared by polymerizing isoprene, butadiene-styrene polymers (GR–S), and chloroprene polymers (neoprene) and oil masterbatched GR–S polymers.

The lubricating oil raffinates useful as starting materials in the process of this invention include the lubricating oil raffinates having a pour point below about 25° F. obtained by the solvent extraction of a lubricating oil stock derived from a crude oil of substantial naphthenic constituency with a solvent selective for aromatics. The lubricating oil raffinates preferably have a maximum A.P.I. gravity of about 30 and a viscosity range of about 35 to 180 SSU at 210° F. and a minimum viscosity of about 50 SSU at 100° F.

If the lubricating oil raffinate has a pour point above about 25° F., then it should be subjected to a solvent dewaxing step. The solvent dewaxing step is carried out by contacting the raffinate with a solvent effective to remove waxy components and in an amount sufficient to reduce the pour point to about 0° to 25° F. The manner of contacting is conventional, i.e. is carried out by admixing oil and solvent and passing the mixture through a chiller and then to a filter to remove wax and distilling the solvent from the dewaxed oil. The solvents effective for this purpose are well-known and include, for example, methyl ethyl ketone admixed with benzene and/or toluene, propane, and a mixture of ethylene dichloride and benzene. Generally, about 100 to 600 percent of solvent based on the oil is sufficient but this can vary with the characteristics of the raffinate. Generally, filter temperatures of about 0° to −20° F. are used.

The lubricating oil stocks useful in the preparation of the lubricating oil raffinates are obtained from crude oils of substantial naphthenic constituency as distinguished from paraffinic oils, e.g., Pennsylvania base oils. Particularly advantageous oils are Mid-Continent (mixed) and naphthenic crudes. Both distillate and residual lubricating oil stocks can be employed.

Solvents which can be used in the production of the lubricating oil raffinates include particularly phenol but other solvents selective for aromatics such as nitrobenzene, furfural, and liquid sulfur dioxide are also useful. Such processes are well-known. For example, phenol extraction comprises passing a feed stock through a phenol treating tower, removing a raffinate oil from the top of the tower, removing an extract oil from the bottom and removing the phenol from the raffinate oil and extract oil by distillation.

The acetone extraction step of this invention can be carried out in either a batch or continuous system of the type normally employed for solvent extraction of lubricating oil distillates and such as employed in preparing the lubricating oil raffinate feed material. The amount of acetone employed can vary from 50 to 700 volume percent of feed material, preferably 100 to 400 volume percent of feed material. The acetone extraction temperature can vary from 40° to 150° F. and the pressure from atmospheric to 50 p.s.i.g. The amount of acetone and the temperatures and pressures employed are dependent upon the properties of the specific feed material and the properties of the acetone raffinate which upon further treatment will yield a rubber extending oil having the desired characteristics.

The sulfuric acid treating step of the process of this invention comprises contacting the raffinate from the acetone extraction with concentrated sulfuric acid, separating sludge from the resulting acid oil, neutralizing the acid oil with a solution effective to neutralize the acid oil and then washing the neutralized oil with water to remove excess neutralizer. The concentrated sulfuric acid should be at least 95% acid and preferably 98% acid. The temperature of acid treating can range from about 80° to 150° F. and preferably about 80° to 100° F. The amount of concentrated sulfuric acid can range from about 5 to 30 pounds of acid per barrel of acetone raffinate again depending upon the properties of the specific acetone raffinate employed and the desired characteristics of the rubber extending oil product.

The sludge is removed from the acid oil by settling and a pepper blow can be used to remove fine sludge. Solutions of sodium hydroxide or sodium carbonate are preferred for the neutralization step although other neutralizing agents can be used. The strength and amount of neutralizing solution is not critical provided that at least 120 percent of the theoretical amount required, based on the acid number of the acid oil, is used.

The neutralized oil is water washed until both oil and wash are neutral to phenolphthalein or a similar indicator. Any of the common washing procedures such as spray washing or air blowing a water wash can be employed. I have found, however, that it is important that the water washing step of particularly heavy stocks be carried out by spray washing to reduce the tendency for formation of troublesome emulsions during the washing step. Air blowing a water wash or steam breaking results in troublesome emulsions. The use of spray washing, however, effectively reduces the tendency for emulsion formation.

The neutralized and washed oil can be subjected to further finishing steps although these are not essential. For example, the neutralized and washed oil can be contacted with an adsorbent earth such as an adsorbent clay. The treatment removes any sodium sulfonate soaps remaining in the oil from the acid treating step along with residual acids, solvents or other impurities and improves odor and color stability. It is important to remove soaps from the treated oil since if oil containing soaps becomes contaminated with water, e.g. during shipment or storage, a moisture haze or partial emulsification would occur and the oil would be useless as a rubber processing oil. Preferably, the treatment is carried out at a temperature of about 200° to 400° F. Generally, a dosage of about 5 to 20 pounds of earth per barrel of treated oil is sufficient but this amount can vary with the nature of the oil and the processing conditions of the acid-treating and dewaxing steps. The treatment can be carried out by direct contact of the oil with the earth in the well-known manner of contact filtration wherein finely divided clay is admixed with the oil to form a slurry which is heated for a period of time and the oil then separated. Alternatively, the well-known percolation filtration method can be used wherein the earth is packed in a tower and oil is charged to the top and percolates through the bed of earth and the filtered oil is removed from the bottom of the tower. By the term "adsorbent earth," I mean to include the earths conventionally used in such treatment, e.g. fuller' earth, bauxite, and various activated clays.

Alternatively the neutralized and washed oil can be subjected to a mild hydrofinishing treatment employing a hydrogenation catalyst. Various methods for manufacturing such catalysts have been described in the art, such as in Byrns Patent 2,325,033, and such catalysts generally consist of from about 2 to 5 percent by weight of cobalt oxide and 5 to 15 percent by weight of molybdic oxide, the balance being alumina. Also useful are, for instance, nickel on porcelain, silica or alumina; molybdenum, tungsten, cobalt, nickel oxides and sulfides; and, platinum and palladium on alumina. A preferred catalyst is cobalt molybdate supported on alumina. Such preferred catalysts can be prepared by the method of Keith et al. described in U.S. Patent 2,938,002, dated May 24, 1960.

Further, in the hydrogenation step a temperature of from 550° to 750° F., a pressure of from 400 to 1500 p.s.i.g. and a weight hourly space velocity (weight units of oil per weight unit of catalyst per hour) of from 0.1 to 5.0 are used. The oil is hydrogenated while it is in admixture with from 700 to 5000 standard cubic feet of hydrogen per barrel of oil.

The process of this invention will be further illustrated by reference to the following examples.

EXAMPLE 1

A dewaxed lubricating oil raffinate obtained from the phenol extraction of a Mid-Continent 200 SSU/210° F. raw lubricating oil stock to a viscosity index level of about 73 was extracted with an equal volume of acetone, treated with 30 pounds per barrel of 98% sulfuric acid, neutralized with caustic, and contacted with clay. The details of each treating step are set forth below in Table I. The finished processing oils were then subjected to a stain test which consists of mixing equal quantities by weight of titanium dioxide and the oil being tested. The resultant paste is exposed to ultra-violet light for 48 hours at about 115° F. The surface of the paste is then examined for discoloration. The results from this type of test have been found to correlate well with similar testing of actual rubber compositions. The stain test results, shown in Table II, show that the process of this invention produce non-staining rubber extender oils. Also shown in Table II are the characteristics of the raffinate charge stock and of the finished processing oil.

*Table I*

CONDITIONS AND YIELDS ON ACETONE EXTRACTION AND ACID TREATING

Acetone extraction conditions:
| | |
|---|---|
| Acetone dosage, vol. percent | 100.0 |
| Temperature, °F. | 76 |
| Mixing time, min. | 5 |
| Settle time, min. | 30 |
| Yield of solvent free oil, vol. percent | 90.0 |

Acid treating conditions:
| | |
|---|---|
| Oil charge, lbs. | 3.5 |
| Sulfuric acid, lbs./bbl. | 30 |
| Acid strength, percent | 98 |
| Temperature, °F. | 76 |
| Air blow, min. | 30 |
| Settle, hours | 16 |
| Acid oil yield, wt. percent | 93.0 |
| Air blow free $SO_2$, hrs. | 1 |
| Settle, hours | 16 |
| Neutralize (20% caustic sol.), percent water wash neutral | 1 |

Clay contacting:
| | |
|---|---|
| Attapulgus clay, #/bbl. | 15 |
| Temperature, °F. | 180 |

Table II
ACID TREATED ACETONE EXTRACTED OIL TESTS ON CHARGE AND PRODUCTS

| | Charge oil | Acetone Raffinate | Acetone Extract | Acetone raffinate acid treated |
|---|---|---|---|---|
| Tests: | | | | |
| Gravity, °API | 27.1 | 27.8 | 21.2 | 29.0 |
| Flash, °F | 430 | 430 | 430 | 430 |
| Fire, °F | 490 | 490 | 490 | 490 |
| Viscosity, cs./100° F | 58.52 | 56.55 | 97.26 | 52.87 |
| Viscosity, cs./210° F | 6.879 | 6.810 | 8.095 | 6.688 |
| Viscosity index | 73.7 | 76.8 | 30.8 | 83.5 |
| Pour, °F | 0 | +5 | −10 | +5 |
| Color, ASTM | 2.5 | 2.5 | 5.5 | 0.5 |
| Aniline point, °C | 93.4 | 95.3 | 69.0 | 99.0 |
| Refractive index, $n_D^{20}$ | 1.4925 | 1.4898 | 1.5183 | 1.4059 |
| Molecular weight | 419 | 427 | 385 | 445 |
| Density at 20° C | 0.8886 | 0.8850 | 0.9235 | 0.8783 |
| Hydrocarbon analysis: | | | | |
| Viscosity gravity constant | 0.838 | 0.832 | 0.873 | 0.824 |
| Refractivity intercept | 1.0483 | 1.0473 | 1.0566 | 1.0468 |
| Percent aromatic carbons | 12 | 10 | 25.8 | 7.0 |
| Percent naphthenic carbons | 29.8 | 29 | 23.0 | 29.5 |
| Percent paraffin chain carbons | 58.2 | 61 | 51.2 | 63.5 |
| TiO₂ stain test | Poor | | | Trace (faint) |

EXAMPLE 2

A further sample of the dewaxed lubricating oil raffinate of Example 1 was extracted with an equal volume of acetone to yield 91.4 volume percent of a raffinate oil. Samples of this raffinate oil were treated with varying amounts of sulfuric acid and tested for staining tendency. The results show that stain properties gradually improve with increased acid dosage. Details of treating and tests on the oils are summarized in Tables III and IV below. Although not shown in Table III, if the acetone extraction step is omitted, the acid treated oils have poorer stain characteristics, i.e. a 30 pounds per barrel 98% sulfuric acid treat on the lubricating oil raffinate charge oil yields on oil having medium stain.

Table III
CONDITIONS AND YIELDS ON ACETONE EXTRACTION AND ACID TREATING

| Acetone extraction conditions | |
|---|---|
| Acetone dosage, vol. percent | 100 |
| Temperature, °F | 73 |
| Mixing time, min | 5 |
| Settling time, min | 30 |
| Yield of solvent free oil, vol. percent | 91.4 |

Table III—Continued

| Acid treating conditions | Treat number | | |
|---|---|---|---|
| | (1) | (2) | (3) |
| Oil charge, lbs | 1.56 | 1.56 | 1.56 |
| Sulfuric acid, lbs./bbl | 30 | 20 | 10 |
| Acid strength, percent | 98 | 98 | 98 |
| Temperature, °F | 85 | 85 | 85 |
| Air blow, min | 30 | 30 | 30 |
| Settle, hours | 16 | 16 | 16 |
| Acid oil yield, wt. percent | 91.7 | 93.5 | 96.5 |
| Air blow free SO², hrs | 1 | 1 | 1 |
| Settle, hours | 16 | 16 | 16 |
| Neutralize (20% caustic sol.) percent water wash neutral | ¾ | ¾ | ¾ |
| Clay contacting: | | | |
| Attapulgus clay, lb./bbl | 15 | 15 | 15 |
| Temperature, °F | 180 | 180 | 180 |

Table IV
ACID TREATED ACETONE EXTRACTED OIL TESTS ON CHARGE AND PRODUCTS

| Tests | Charge oil | Acetone Raffinate | Acetone Extract | Acetone raffinate acid treats | | |
|---|---|---|---|---|---|---|
| | | | | 30 lb./bbl., 98% H₂SO₄ | 20 lb./bbl., 98% H₂O | 10 lb./bbl., 98% H₂SO₄ |
| Gravity, °API | 27.1 | 27.9 | 20.8 | 29.0 | 28.6 | 28.0 |
| Flash, °F | 430 | 430 | 430 | 440 | 430 | 440 |
| Fire, °F | 490 | 490 | 490 | 495 | 490 | 495 |
| Viscosity, cs./100° F | 58.52 | 55.66 | 102.3 | 53.17 | 54.41 | 54.81 |
| Viscosity, cs./210° F | 6.879 | 6.892 | 8.238 | 6.696 | 6.719 | 6.739 |
| Viscosity index | 73.7 | 80.4 | 27.0 | 83.1 | 79.7 | 79.3 |
| Pour, °F | 0 | +5 | −15 | +10 | +5 | +10 |
| Color, ASTM | 2.5 | 2.5 | 6.0 | L1.0 | L1.0 | L1.0 |
| Aniline point, °C | 93.4 | 95.4 | 66.5 | 98.8 | 97.8 | 96.6 |
| Refractive index, $n_D^{20}$ | 1.4925 | 1.4901 | 1.5208 | 1.4860 | 1.4873 | 1.4884 |
| Molecular weight | 419 | 440 | 385 | 463 | 448 | 444 |
| Density at 20° C | 0.8886 | 0.8846 | 0.9235 | 0.8786 | 0.8812 | 0.8823 |
| Hydrocarbon analysis: | | | | | | |
| Viscosity gravity constant | 0.8380 | 0.8320 | 0.8770 | 0.8240 | 0.8270 | 0.8310 |
| Refractive intercept | 1.0483 | 1.0477 | 1.0591 | 1.0467 | 1.0467 | 1.0473 |
| Percent aromatic carbons | 12.0 | 10 | 27.5 | 7 | 7 | 9.5 |
| Percent naphthenic carbons | 29.8 | 30 | 20.5 | 30 | 30 | 29.5 |
| Percent paraffin chain carbons | 58.2 | 60 | 52.0 | 63 | 63 | 61.0 |
| TiO₂ | Poor | Medium+ | | Trace | Light | Medium |

I claim:
1. The process of preparing a hydrocarbon oil useful in the processing of rubber including the steps of subjecting a lubricating oil raffinate having a pour point below about 25° F., obtained by the solvent extraction of a lubricating oil stock derived from a crude oil of substantial naphthenic constituency with a solvent selective for aromatics, to a treatment with acetone in an amount of about 50 to 700 volume percent of the lubricating oil feedstock at a temperature within the range of about 40° to 150° F. and a pressure in the range of about 0 to 50 p.s.i.g., separating a raffinate and an extract, and treating the separated raffinate with concentrated sulfuric acid in an amount of about 5 to 30 pounds per barrel of oil.

2. The process of claim 1 wherein the acid-treated raffinate is further treated with an adsorbent earth.

References Cited by the Examiner
UNITED STATES PATENTS

| | | | |
|---|---|---|---|
| 1,698,471 | 1/29 | Bransky et al. | 208—45 |
| 2,255,283 | 9/41 | Forrest | 208—45 |
| 2,702,266 | 2/55 | Kalinowski | 208—45 |
| 2,931,766 | 4/60 | Rausch | 208—45 |
| 2,990,362 | 6/61 | Fox | 208—271 |
| 3,003,945 | 10/61 | Garwin | 208—45 |

ALPHONSO D. SULLIVAN, *Primary Examiner.*